(12) United States Patent
Mark et al.

(10) Patent No.: US 6,829,763 B1
(45) Date of Patent: Dec. 7, 2004

(54) PARTITIONED EXECUTIVE STRUCTURE FOR REAL-TIME PROGRAMS

(75) Inventors: John G. Mark, Pasadena, CA (US); Daniel A. Tazartes, West Hills, CA (US); Jonathan A. Lincoln, West Hills, CA (US); Philip T. Kent, Chatsworth, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/572,298

(22) Filed: May 16, 2000

(51) Int. Cl.$^7$ ................................................. G06F 9/46
(52) U.S. Cl. ...................... 718/102; 718/100; 718/103; 718/104; 718/107
(58) Field of Search ................................ 709/104, 100, 709/103, 107, 108, 102, 227, 312, 106; 455/67; 714/45; 375/360; 712/217; 713/400

(56) References Cited

U.S. PATENT DOCUMENTS

| | | | | |
|---|---|---|---|---|
| 3,702,989 A | * | 11/1972 | Provenzano et al. | 714/45 |
| 4,493,020 A | * | 1/1985 | Kim et al. | 712/217 |
| 4,747,040 A | * | 5/1988 | Blanset et al. | 709/108 |
| 4,935,944 A | * | 6/1990 | Everett | 377/48 |
| 4,954,948 A | * | 9/1990 | Hira et al. | 709/107 |
| 4,980,824 A | * | 12/1990 | Tulpule et al. | 709/106 |
| 5,062,059 A | * | 10/1991 | Youngblood et al. | 709/217 |
| 5,168,566 A | * | 12/1992 | Kuki et al. | 709/103 |
| 5,287,508 A | * | 2/1994 | Hejna et al. | 709/102 |
| 5,386,561 A | * | 1/1995 | Huynh et al. | 709/103 |
| 5,625,775 A | * | 4/1997 | Davis et al. | 709/227 |
| 5,784,618 A | * | 7/1998 | Toutonghi | 709/107 |
| 5,799,048 A | * | 8/1998 | Farjad-Rad et al. | 375/360 |
| 5,896,561 A | * | 4/1999 | Schrader et al. | 455/67.11 |
| 5,991,820 A | * | 11/1999 | Dean | 709/312 |
| 6,009,507 A | * | 12/1999 | Brooks et al. | 712/28 |
| 6,111,591 A | * | 8/2000 | Ohtake et al. | 345/531 |
| 6,266,778 B1 | * | 7/2001 | Bell | 713/400 |
| 6,298,370 B1 | * | 10/2001 | Tang et al. | 709/102 |
| 6,345,287 B1 | * | 2/2002 | Fong et al. | 709/102 |
| 6,356,989 B1 | * | 3/2002 | Hays et al. | 711/205 |
| 2001/0037471 A1 | * | 11/2001 | Liu | 713/600 |
| 2003/0050960 A1 | * | 3/2003 | Kawamura et al. | 709/202 |

* cited by examiner

*Primary Examiner*—Meng-Al T. An
*Assistant Examiner*—Lilian Vo
(74) *Attorney, Agent, or Firm*—Robert E. Malm

(57) ABSTRACT

The invention is a method and apparatus for repetitively executing a plurality of software packages at a plurality of rates utilizing a common set of computational resources. The method consists of counting contiguous time increments and executing a plurality of software packages. Each software package is executed during each time increment in one or more sequences of time increments. The time increments in each sequence recur at a predetermined rate, and the time increments assigned to one software package do not overlap the time increments assigned to any other of the plurality of software packages.

10 Claims, 2 Drawing Sheets

| COUNTER VALUE | SLOT NO. | SUB-SLOT NO. | RATE 1 | RATE 2 | RATE 3 | RATE 3 |
|---|---|---|---|---|---|---|
| 00000 | 0 | 0 | X | | | |
| 00001 | 0 | 1 | | | | |
| 00010 | 0 | 2 | | | | |
| 00011 | 0 | 3 | | | | |
| 00100 | 1 | 0 | | X | | |
| 00101 | 1 | 1 | | | | |
| 00110 | 1 | 2 | | | | |
| 00111 | 1 | 3 | | | | |
| 01000 | 2 | 0 | X | | | |
| 01001 | 2 | 1 | | | | |
| 01010 | 2 | 2 | | | | |
| 01011 | 2 | 3 | | | | |
| 01100 | 3 | 0 | | | X | |
| 01101 | 3 | 1 | | | | |
| 01110 | 3 | 2 | | | | |
| 01111 | 3 | 3 | | | | |
| 10000 | 4 | 0 | X | | | |
| 10001 | 4 | 1 | | | | |
| 10010 | 4 | 2 | | | | |
| 10011 | 4 | 3 | | | | |
| 10100 | 5 | 0 | | X | | |
| 10101 | 5 | 1 | | | | |
| 10110 | 5 | 2 | | | | |
| 10111 | 5 | 3 | | | | |
| 11000 | 6 | 0 | X | | | |
| 11001 | 6 | 1 | | | | |
| 11010 | 6 | 2 | | | | |
| 11011 | 6 | 3 | | | | |
| 11100 | 7 | 0 | | | | X |
| 11101 | 7 | 1 | | | | |
| 11110 | 7 | 2 | | | | |
| 11111 | 7 | 3 | | | | |
| 00000 | 0 | 0 | X | | | |
| 00001 | 0 | 1 | | | | |
| 00010 | 0 | 2 | | | | |
| 00011 | 0 | 3 | | | | |
| 00100 | 1 | 0 | | X | | |
| 00101 | 1 | 1 | | | | |
| 00110 | 1 | 2 | | | | |
| 00111 | 1 | 3 | | | | |
| 01000 | 2 | 0 | | | | |

| COUNTER VALUE | SLOT NO. | SUB-SLOT NO. | RATE 1 | RATE 2 | RATE 3 | RATE 3 |
|---|---|---|---|---|---|---|
| 00000 | 0 | 0 | X | | | |
| 00001 | 0 | 1 | | | | |
| 00010 | 0 | 2 | | | | |
| 00011 | 0 | 3 | | | | |
| 00100 | 1 | 0 | | X | | |
| 00101 | 1 | 1 | | | | |
| 00110 | 1 | 2 | | | | |
| 00111 | 1 | 3 | | | | |
| 01000 | 2 | 0 | X | | | |
| 01001 | 2 | 1 | | | | |
| 01010 | 2 | 2 | | | | |
| 01011 | 2 | 3 | | | | |
| 01100 | 3 | 0 | | | X | |
| 01101 | 3 | 1 | | | | |
| 01110 | 3 | 2 | | | | |
| 01111 | 3 | 3 | | | | |
| 10000 | 4 | 0 | X | | | |
| 10001 | 4 | 1 | | | | |
| 10010 | 4 | 2 | | | | |
| 10011 | 4 | 3 | | | | |
| 10100 | 5 | 0 | | X | | |
| 10101 | 5 | 1 | | | | |
| 10110 | 5 | 2 | | | | |
| 10111 | 5 | 3 | | | | |
| 11000 | 6 | 0 | X | | | |
| 11001 | 6 | 1 | | | | |
| 11010 | 6 | 2 | | | | |
| 11011 | 6 | 3 | | | | |
| 11100 | 7 | 0 | | | | X |
| 11101 | 7 | 1 | | | | |
| 11110 | 7 | 2 | | | | |
| 11111 | 7 | 3 | | | | |
| 00000 | 0 | 0 | X | | | |
| 00001 | 0 | 1 | | | | |
| 00010 | 0 | 2 | | | | |
| 00011 | 0 | 3 | | | | |
| 00100 | 1 | 0 | | X | | |
| 00101 | 1 | 1 | | | | |
| 00110 | 1 | 2 | | | | |
| 00111 | 1 | 3 | | | | |
| 01000 | 2 | 0 | | | | |

FIG. 3

PARTITIONED EXECUTIVE STRUCTURE FOR REAL-TIME PROGRAMS

CROSS-REFERENCE TO RELATED APPLICATIONS

Not applicable

STATEMENT REGARDING FEDERALLY SPONSORED RESEARCH AND DEVELOPMENT

Not applicable

BACKGROUND OF THE INVENTION

This invention relates generally to real-time computer systems and more specifically to the software structure for such systems.

The control and operation of real-time computer systems typically require a communications software package to control the communications with external data sources and sinks, a database software package for controlling the storage, retrieval, and updating of system data, a transaction software package for controlling the execution of one or more applications, and an operating system that exercises overall control of the the individual software packages.

In the past, one of the problems that has hampered missionization or customization of software is the competition for computer throughput. Generally, in the case of embedded real-time software in an inertial navigation system for example, one portion of the software is common (and usually essential) to all applications while additional portions are added or customized to satisfy specific applications. If the common and custom software execute in the same processor, there will be an inevitable competition for throughput resources.

The operating system together with a system of priorities provides a solution to this problem in many instances. Another approach replaces the operating system with a means for software partitioning. Software partitioning provides a means for avoiding interaction between different portions of the software. However, the partitioning methods to date rely on an accurate accounting for the amount of time required to execute different tasks. If execution times differ from the plan, one task might "step" on another leading to potentially catastrophic consequences. This is particularly a concern if a user designs and programs customized software to coexist with the essential common software.

BRIEF SUMMARY OF THE INVENTION

The invention is a method and apparatus for repetitively executing a plurality of software packages at a plurality of rates utilizing a common set of computational resources. The method consists of counting contiguous time increments and executing a plurality of software packages. Each software package is executed during each time increment in one or more sequences of time increments. The time increments in each sequence recur at a predetermined rate, and the time increments assigned to one software package do not overlap the time increments assigned to any other of the plurality of software packages.

The method includes the case where a time increment is a sub-slot of a time slot, a time slot containing a plurality of sub-slots. In this case, one and only one software package is assigned to a sub-slot for execution. A software package can be programmed to execute during any number of sub-slots in a time slot. A software package can also be programmed to execute at two or more rates.

BRIEF DESCRIPTION OF THE DRAWINGS

FIG. 3 shows how software can be partitioned to execute at three rates.

DETAILED DESCRIPTION OF THE INVENTION

The invention is a time-partitioning arrangement that avoids the inflexibility of prior time-partitioning schemes. The invention will be described in reference to an inertial navigation system. However, it should be recognized that it applies to any similar embedded, realtime software application.

Figure 1:
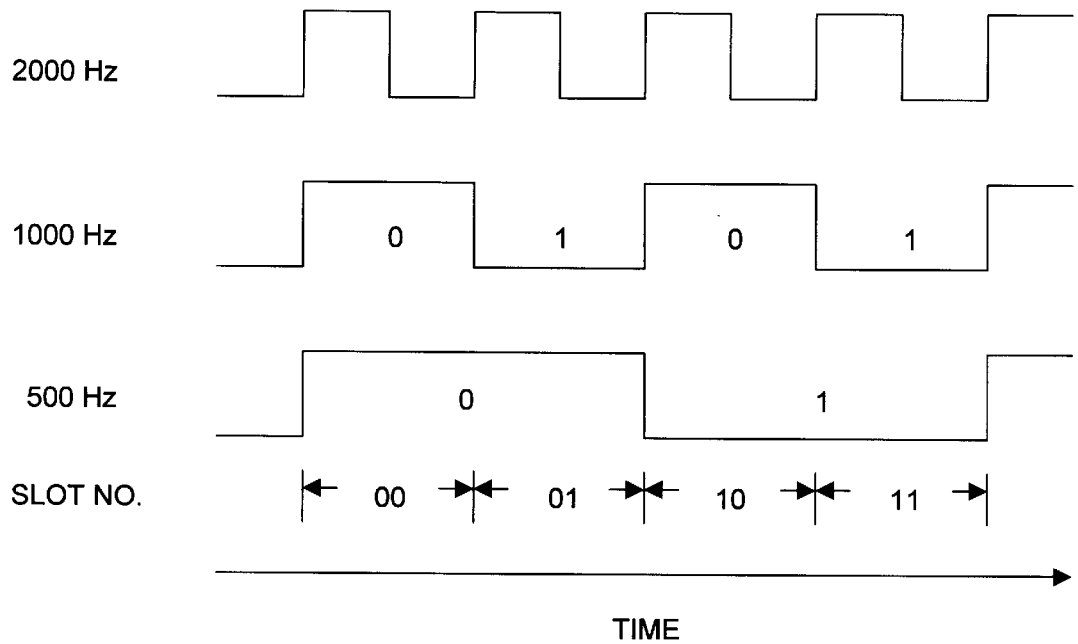
FIG. 1 shows an example of a set of timing signals and how they define time slots.

The partitioning arrangement is based on time slots 00, 01, 10, and 11 determined by 1000-Hz and 500-Hz clock signals derived from a 2000-Hz signal, as shown in FIG. 1.

Figure 2:
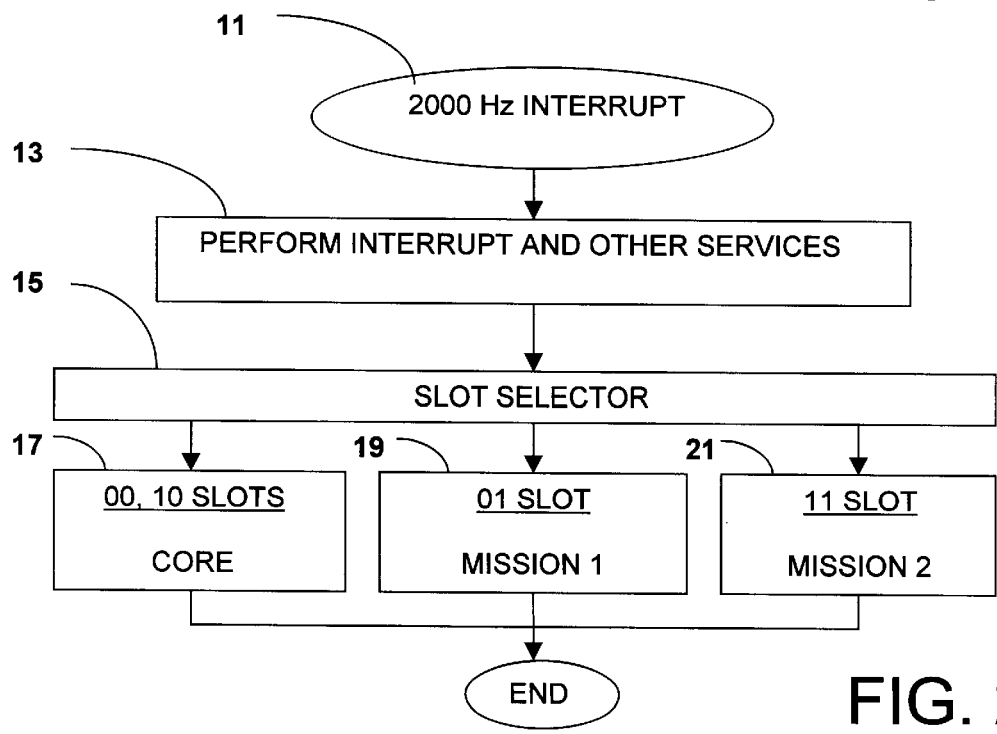
FIG. 2 shows the partitioned executive structure for the real-time program associated with an inertial navigation system.

The computer system software is driven from a 2000-Hz hardware interrupt 11 as shown in FIG. 2. At this 2000-Hz rate, several essential tasks are performed 13 such as interrupt servicing, reading of inertial data, etc. The selection of the next software package for execution is accomplished by slot selector 15 based on the time slot.

The execution of the core software package 17 occurs during time slots 00 and 10 at a rate of 1000 Hz. The core package includes data compensation procedures and the common essential procedures associated with the inertial measurement unit and navigation. The core package can also include the execution of strapdown algorithms at a rate of 500 Hz using either time slot 00 or time slot 10 or a combination thereof. Time slot 01 is reserved for the execution 19 of the mission 1 software package. Time slot 11 is reserved for the execution 21 of the mission 2 software package. One of the mission partitions 19 or 21 could equally well be allocated to user software. The different time slots can be assigned in arbitrary combinations. For example, time slots 00 and 01 could be assigned to core functions and time slots 10 and 11 could be assigned to mission functions.

This partitioning arrangement will not permit mission or user software to take time away from core software. The implementation of this partitioning arrangement, together with appropriate memory protection which many processors support, ensures independence in the execution of mission and core functions. Mission changes will not affect core software thereby avoiding costly fine-tuning of execution time allocation and regression testing. With this partitioning approach, user software can also implement its own executive within its allocated time window thereby avoiding the need for priority sharing with core and mission software.

In order to execute tasks at lower rates in each partition, each time slot may have its own scheduler that will divide the basic rate at which the partition is called by the appropriate factors in order to schedule the lower-rate tasks belonging to that particular partition. For example, referring to FIGS. 1 and 2, a 100-Hz task belonging to the core partition could be called every fifth time slot 00. Similarly, a 100-Hz task belonging to the Mission 1 partition could be called every fifth time slot 01. Because these 100-Hz tasks are guaranteed to occur in different time slots, there is no possibility of the Mission 1 100-Hz task interfering with the core 100-Hz task and vice versa. This approach can be implemented for any number of rates which can be subdivided from the basic 500-Hz rate which is the maximum rate at which any particular time slot can be activated in FIGS. 1 and 2. It should be noted however that the approach shown in FIGS. 1 and 2 is derived from a basic 2,000-Hz clock. Other frequencies are possible as appropriate. Furthermore, four time slots are shown with equal durations. It is also possible using a set of timers to implement the time slot partition with unequal durations. It is also possible to subdivide a basic repeating interval into any number of time slots using timers. The optimum design should be based on the specific requirements and a tradeoff between simplicity and low overhead on the one hand and additional flexibility on the other.

An expanded version of the invention is shown in FIG. 3. The positive transitions of a clock signal are counted in a five-bit counter. The counter values repeat after every 32 clock transitions. Time is divided into slots that are assigned numbers in accordance with the three most significant bits of the counter value. Each slot is divided into four sub-slots that are assigned numbers in accordance with the two least significant bits of the counter value.

If the execution of a software package is triggered when the least significant bit of the slot number equals 0 and the sub-slot number equals 0, the execution will occur at Rate 1 as indicated in FIG. 3 by the X's under the Rate 1 heading. A total of four software packages can be executed at Rate 1 by enabling the execution of the software packages in different sub-slots. If only one software package is to be executed at Rate 1, all of the sub-slots in the assigned slots can be utilized for the execution of the software package.

If two software packages are to be executed at Rate 1, each package could be assigned two sub-slots for execution or one might be assigned one sub-slot and the other might be assigned three sub-slots.

If the execution of a software package is triggered when the two least significant bits of the slot number equals 01 and the sub-slot number equals 0, the execution will occur at Rate 2 as indicated in FIG. 3 by the X's under the Rate 2 heading. Here also, four software packages can be executed at Rate 2 by taking advantage of the sub-slots associated with the assigned slots.

If the execution of a software package is triggered when the the three least significant bits of the slot number equals either 011 or 111 and the sub-slot number equals 0, the execution will occur at Rate 3 as indicated in FIG. 3 by the X's uner the Rate 3 headings. Here too, four software packages can be executed at Rate 3 in either Rate-3 mode by taking advantage of the sub-slots associated with the assigned slots.

A software package can be executed at rates other than those provided by Rate 1, Rate 2, and Rate 3 individually by combining the rates. The rate achieved with a Rate-2 execution doubles the rate of a Rate-3 execution. The rate achieved with a combination of Rate-2 and Rate-3 executions tripples the rate of a Rate-3 execution. The rate achieved with a Rate-1 execution quadruples the rate of a Rate-3 execution. The rate achieved with the combination of Rate-1 and Rate-3 executions increases by fivefold the rate of a Rate-3 execution. The rate achieved with the combination of Rate-i and Rate-2 executions increases by sixfold the rate of a Rate-3 execution. The rate achieved with the combination of Rate-1, Rate-2, and Rate-3 executions increases by sevenfold the rate of a Rate-3 execution. And finally, the rate achieved with the combination of Rate-1, Rate-2, and two Rate-3 executions increases by eightfold the rate of a Rate-3 execution.

Two software packages can be alternately assigned to a Rate-X slot and thereby executed at Rate (X+1). Or P software packages can assigned in sequence to a Rate-X slot and thereby executed at Rate X divided by P.

It should be clear from FIG. 3 that the resources necessary to execute each software package is exclusively available to each software package by the prescribed assignment of slots and sub-slots to the software packages to be executed.

The slot numbers SN for execution of Rate N software packages are defined by the equation $$S_N \text{ modulo } 2^N = 2^{N-1} - 1 \qquad (1)$$

If Nmax is the highest Rate number to be used, then the second set of slot numbers $S_{Nmax2}$ for execution of Rate Nmax software packages are defined by the equation $$S_{Nmax2} \text{ modulo } 2^{Nmax} = 2^{Nmax} - 1 \qquad (2)$$

The advantages of the invention are reduced maintenance costs, reduced missionization cost, improved user software flexibility, improved reliability, and improved software partition integrity.

What is claimed is:

1. A method for repetitively executing a plurality of software packages at a plurality of rates, utilizing a common set of computational resources, the method comprising the steps:

(a) assigning each software package to a sequence of time increments selected from a sequence of contiguous time increments;

(b) executing the plurality of software packages, a software package being executed in its entirety during each time increment in its assigned sequence of time increments, the time increments in each assigned sequence of time increments occurring at a predetermined rate, the time increments assigned to one software package not overlapping the time increments assigned to any other of the plurality of software packages.

2. The method of claim 1 wherein a time increment consists of one or more sub-slots of a time slot, a time slot containing N sub-slots, one and only one software package being assigned to a sub-slot for execution, step (a) comprising the steps:

(a1) counting the number of sub-slots modulo N;

(a2) counting the number of slots;

(a3) assigning a software package to a sequence of slots and one or more sub-slots.

3. The method of claim 1 wherein a time increment consists of one or more sub-slots of a time slot, a time slot containing N sub-slots, one and only one software package being assigned to a sub-slot for execution, step (b) comprising the step:

(b1) executing at least one software package during n sub-slots of a time slot, n being an integer between 1 and N.

4. The method of claim 1 wherein a time increment consists of one or more sub-slots of a time slot, a time slot containing N sub-slots, one and only one software package being assigned to a sub-slot for execution, step (b) comprising the step:

(b1) executing repeatedly at least one software package at Rate-1, Rate-2, ..., first Rate-M, or second Rate-M or any combination of two or more thereof.

5. The method of claim 1 wherein a time increment consists of one or more sub-slots of a time slot, a time slot containing N sub-slots, one and only one software package being assigned to a sub-slot for execution, step (b) comprising the step:

(b1) executing a plurality of software packages in a single slot sequence, the software packages being assigned slots in sequence, each software package being assigned 1 or more sub-slots in the slots assigned to the software package.

6. Apparatus for practicing the method of claim 1.

7. Apparatus for repetitively executing a plurality of software packages at a plurality of rates, the apparatus comprising:

a memory for storing the identity of a software package to be executed in its entirety during each time increment in a sequence of time increments selected from a sequence of contiguous time increments;

a computer system for executing the software package assigned to the present time increment, the software package being executed in its entirety during each time increment in its assigned sequence of time increments, the time increments in each assigned sequence of time increments occurring at a predetermined rate, the time increments assigned to one software package not overlapping the time increments assigned to any other of the plurality of software packages.

8. The apparatus of claim 7 wherein a time increment consists of one or more sub-slots of a time slot, a time slot containing N sub-slots, one and only one software package being assigned to a sub-slot for execution, an execution rate of Rate-1, Rate-2, ..., first Rate-M, or second Rate-M or any combination of two or more thereof being assigned to each software package, one or more sub-slots being assigned to each software package for each rate of execution.

9. The apparatus of claim 8 wherein the identities of the plurality of software packages are stored in memory as a function of time slot number and sub-slot number, slot numbers $S_M$ for a Rate-M execution of a software package being determined from the equation $$S_M \text{ modulo } 2^M = 2^{M-1} - 1,$$

the slot numbers $S_{Mmax2}$ for the second Rate-$M_{max}$ execution of a software package being determined from the equation $$S_{Mmax2} \text{ modulo } 2^{Mmax} = 2^{Mmax} - 1,$$

$M_{max}$ being the highest Rate number being used.

10. The apparatus of claim 7 wherein a time increment consists of one or more sub-slots of a time slot, a time slot containing N sub-slots, a plurality of software packages being assigned to slots in a single slot sequence, the software packages being assigned in sequence to the slots of the single slot sequence, each software package being assigned 1 or more sub-slots in the slots assigned to the software package.

* * * * *